United States Patent [19]

Johansson

[11] Patent Number: 4,727,981
[45] Date of Patent: Mar. 1, 1988

[54] FLEXIBLE CONVEYOR

[75] Inventor: Lars J. Johansson, Eskilstuna, Sweden

[73] Assignee: Aktiebolaget SKF, Gothenburg, Sweden

[21] Appl. No.: 829,981

[22] Filed: Feb. 18, 1986

[30] Foreign Application Priority Data

Mar. 28, 1985 [SE] Sweden .................... 8501538

[51] Int. Cl.$^4$ ............................. B65G 15/60
[52] U.S. Cl. ....................... 198/841; 198/861.2
[58] Field of Search ......... 198/841, 861.2, 861.3, 198/735

[56] References Cited

U.S. PATENT DOCUMENTS

| 3,584,731 | 6/1971 | Dahlem | 198/861.2 |
| 3,796,296 | 3/1974 | Bakker | 198/861.2 |
| 4,541,525 | 9/1985 | Braun et al. | 198/735 |
| 4,618,057 | 10/1986 | Howser | 198/861.2 |

FOREIGN PATENT DOCUMENTS 2069442  8/1981  United Kingdom ............... 198/841

Primary Examiner—Joseph E. Valenza
Attorney, Agent, or Firm—Eugene E. Renz, Jr.

[57] ABSTRACT

In a conveyor incorporating a flexible track (4) being guiding and supported on at least two beams (2, 3), which are angularly adjustable relative to each other, the two beams (2, 3) are arranged in a row after each other with an interspace between them and interconnected to each other by means of a joint. The track is guided by two sliding ledges (15, 16, 17, 18) which are jointed (19, 20) adjacent the interspace. A portion (21, 22) of each sliding ledge overlaps the interspace between the beams and is slidably arranged on a supporting edge of the beam on which the joint of the sliding ledge is situated.

3 Claims, 3 Drawing Figures

FLEXIBLE CONVEYOR

FIELD OF THE INVENTION

The invention refers to a conveyor of the type defined in the preamble of claim 1.

BACKGROUND OF THE INVENTION

In many connections it is desirable to transfer goods transported on a conveyor to different connecting means, such as e.g. conveyor devices or stocks, or to collect goods from different means to a common conveyor.

It is earlier known, e.g. by U.S. Pat. No. 1,518,759, to design a conveyor thus that an end portion thereof is movable in several directions, whereby its position can be altered thus that the portion can alternatively be connected to different means located within the movement range of the portion. The conveyor thereby incorporates a plurality of beams angularly adjustable relative to each other and connected to each other by means of suitable members.

SUMMARY OF THE INVENTION

In order to give a desired movability of the movable beams there must be a joint having a considerable width of opening at the connection between the beams. In devices where the conveyor track is constituted by a chain composed by articulated interconnected links, the presence of a joint between two beams, means that the supporting and guiding of the chain will be impaired causing its movement to be obstructed and there is a risk that a chain link may get caught in the joint.

The purpose of the present invention is to provide a conveyor of the type defined in the preamble, in which the conveyor track is guaranteed an unobstructed and unhampered movement. This has been obtained thereby that the conveyor is designed with the features defined in claim 1. Such a conveyor can be manufactured in a simple manner and the movability of the movable beams is not hampered by the steps taken for achieving the purpose of the invention.

BRIEF DESCRIPTION OF THE DRAWINGS

The invention will hereinafter be further described with reference to an embodiment according to the accompanying drawings, in which.

DESCRIPTION OF THE PREFERRED EMBODIMENT

Figure 1:
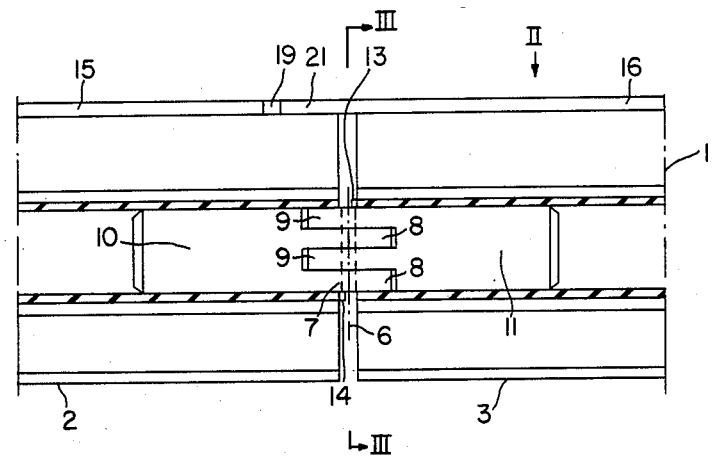
FIG. 1 shows a connection between two beams in a longitudinal section taken at a plane perpendicular to the loading surface of the conveyor according to I—I in FIG. 3 and with the conveyor track removed.
Figure 2:
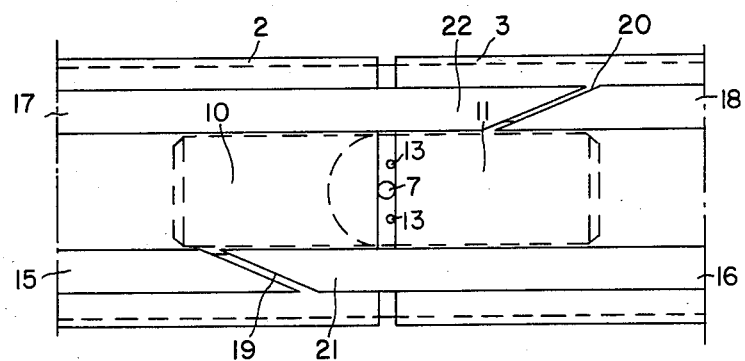
FIG. 2 shows a connection in a view in a plane parallel to the loading surface of the conveyor according to II in FIG. 1 and with the conveyor track removed.
Figure 3:
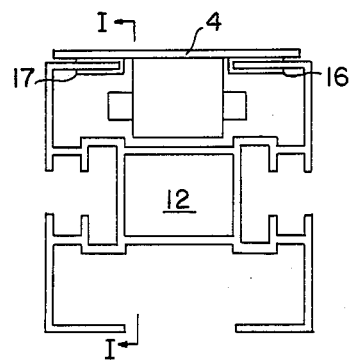
FIG. 3 shows an end view of a beam according to III—III in FIG. 1 and with the means interconnecting the beams removed.

The conveyor 1 incorporates a number of beams 2, 3 which support and guide a flexible track 4 (FIG. 3). The track can e.g. be a chain which is composed of a plurality of articulatedly interconnected links. The goods to be transported is arranged on the surface of the track and the track is driven in a suitable manner thus that it moves along the beams. The two beams 2, 3 are arranged in a row and they are angularly adjustable relative to each other. They are connected to each other by members, which incorporate two elements interconnected by a link, which allows a relative angular adjustment of the element in at least one plane. FIGS. 1 and 2 show how the beams 2 and 3 are connected to each other. The two elements of the connecting member is interconnected with a link formed as a shaft 7 inserted through lug formed portions 8, 9 which overlap each other and are provided with coaxial holes in each element, whereby at least one of the elements is pivotably supported on the shaft 7. Each element has a portion 10 and 11 respectively, projecting from the link, which portions are attachable to a beam 2, 3 which at least partly encloses said portion. The portions 10, 11 can e.g. be of rectangular shape and can be inserted in axial recesses having the corresponding rectangular profile in each beam, e.g. in the form of cavities 12 according to FIG. 3. As attachment means it can be used e.g. clamping screws arranged in transverse holes which open in each recess.

In order to make it possible for the beams to be angularly adjusted relative to each other, the opposite end surfaces of the beams must be situated at a certain distance from each other. This can be obtained thereby that the connecting members of the beams are insertable in recesses in each beam and each one of the elements, which are angularly adjustable relative to each other, in the connecting member is provided with means for limiting the insertion thus that an interspace in the joint between the opposite end surfaces of the beams is secured on both sides of the shaft of the link of the connecting member. In the embodiment shown these means consist of stop lugs 13 and 14 respectively which are offset relative to each other in the longitudinal direction of the beams and limit the insertion of the elements in the recesses of each beam 2, 3.

The interspace between the beams, necessary for angular adjustment of the beam 2 relative to the beam 3, could possibly constitute a bar for the movement of the conveyor track 4. A chain link could e.g. get stuck in the interspace, and vibrations could appear when the links pass over the joint. In order to prevent this, there are provided sliding ledges 15, 16, 17, 18 e.g. of plastic material and arranged along the supporting edges of the beams for guiding and supporting the conveyor track 4. The sliding ledges are, according to the invention split and provided with two adjoining ends which constitute a gap 19, 20 adjacent the interspace between the beams, whereby always one of the two adjoining sliding ledge portions entirely overlap the interspace between the beams. The sliding ledge thereby will guide the conveyor track over the interspace between the beams, whereby the risk that this shall influence the conveyor track is eliminated. The portion of the sliding ledge, which overlaps the interspace is flexible and arranged thus that it can slide freely along the supporting edge on the beam, on which it is situated. The end portion 21 of the sliding ledge 16 may, for instance, slide along a supporting edge of the beam 2 and the end portion 22 of the sliding ledge 17 may slide along a supporting edge on the beam 3. The presence of the sliding ledges thereby do not prevent the beams 2 and 3 from being angularly adjusted relative to each other. At angular adjustment and the resulting sliding of the sliding ledge portions 21 and 22 the slot width in the gaps 19 and 20 for the sliding ledges are altered and it is, of course, necessary to make sure that the slot width is such that the desired angular adjustment of the beams is allowed. In order to prevent the movement of the conveyor track from being influenced to a mentionable degree by the gaps 19, 20, the end portions of the sliding ledge are cut at oblique angle relative to the movement direction of the track. Each track element e.g. a chain link is thereby always supported by at least one sliding ledge at each side of the center line of the track. The oblique cutting is preferably such that the extension of the gaps between two sliding ledges converge in the normal direction of movement of the conveyor track. Thereby is achieved a passage of the track elements over the sliding ledge joints, which is as unhampered as possible. In order to prevent a track element from subjecting both sliding ledge joints to load at the same time, the gaps 19, 20 are preferably displaced in the direction of movement of the track and located one on each side of the space between two beams.

If only a few members shall be connectable to the conveyor it can be sufficient that one single beam is angularly adjustable relative to a fixed beam. If the beam is movable in a vertical plane, then the conveyor can be connected to a plurality of means arranged above each other and if it is movable in a horizontal plane it can be connected to several means situated side-by-side.

If the goods to be transported is unloaded over the free end of the conveyor, then the invention can be used to allow the unloading point continuously to be connected to e.g. the goods level in a container, whereby the free falling height of the goods is limited and the risk for goods damages is reduced.

The track 4 is preferably closed, whereby it moves around a pulley wheel at the end of the conveyor and follows the rear sides of the beams in a return section of the track. The driving of the track is preferably arranged in connection to a pulley wheel in the, not shown, fixed portion of the conveyor.

If two beams are connected to each other by means of members incorporating two elements connected e.g. with a ball joint, one of the beams can be angularly adjusted relative to the other beam in an arbitrary number of directions, whereby a big flexibility is obtained with use of one joint only. A big flexibility can also be obtained if three beams are interconnected by means of two joints according to FIGS. 1–3 and the shafts of the links are arranged at an angle, e.g. with one horizontal shaft and one vertical shaft.

What is claimed is:

1. A conveyor incorporating a flexible conveyor track (4), guided and supported by at least two beams obliquely adjustable relative to each other and in a row one after the other with an interspace therebetween and interconnected by a pivotal link means, characterized therein, that the conveyor track is guided and supported by sliding ledges (15, 16, 17, 18) of generally U-shaped cross section arranged in two substantially parallel tracks along supporting edges of the beam, each of said sliding ledges being split and provided with gap (19, 20) situated one on each side of the interspace between two beams, whereby one sliding ledge portion of the two longitudinally gapped portions has a flexible portion, which always entirely overlaps the interspace between the beams, and the part (21, 22) of the sliding ledge, which extends from the interspace to the gap is slidably arranged on a supporting edge of the beam on which the gap between the ledge portions is located and is fixedly arranged on a supporting edge of the other beam.

2. A conveyor according to claim 1, characterized therein, that the joints (19, 20) of the sliding ledges are cut at oblique angles relative to the direction of movement for the conveyor track.

3. A conveyor according to claim 2, characterized therein, that the extension of the gaps (19, 20) converge in the normal direction of movement of the conveyor track.

* * * * *